Aug. 3, 1965  R. E. OLSON  3,198,948
APPARATUS FOR MEASURING ACTIVITY LEVELS
OF RADIOACTIVE SAMPLES
Filed April 15, 1963  5 Sheets-Sheet 5
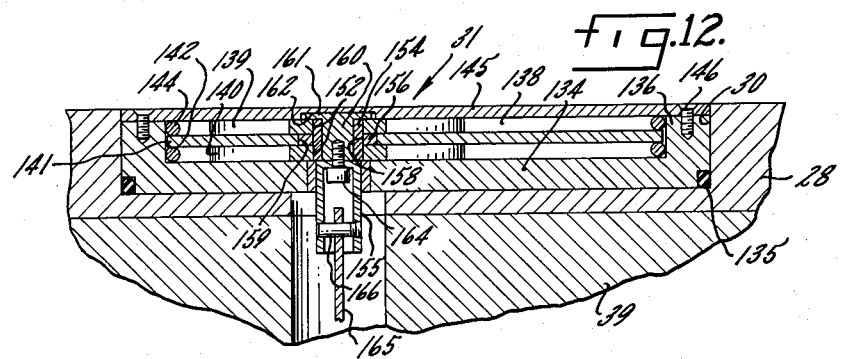
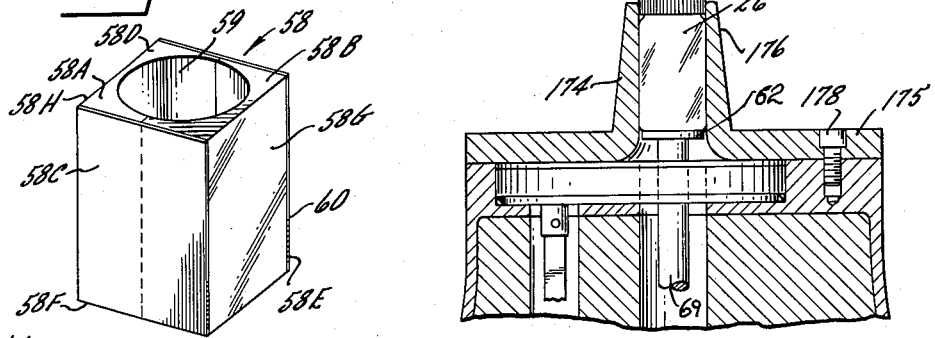
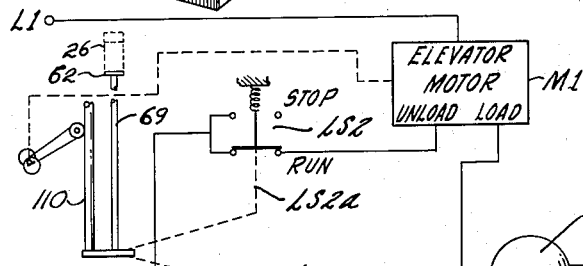
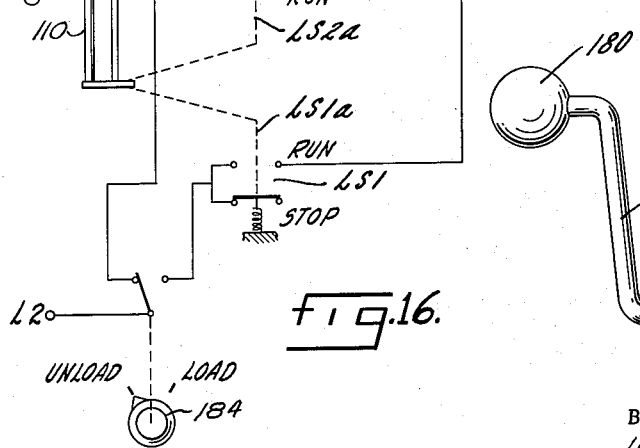
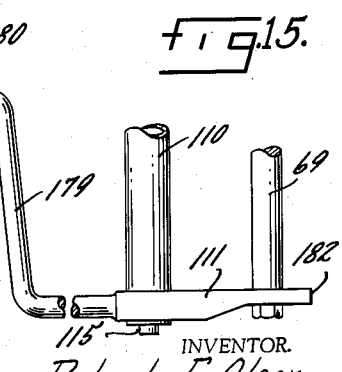
INVENTOR.
Robert E. Olson,
BY
Wolfe, Hubbard, Voit & Osann
ATTORNEYS.

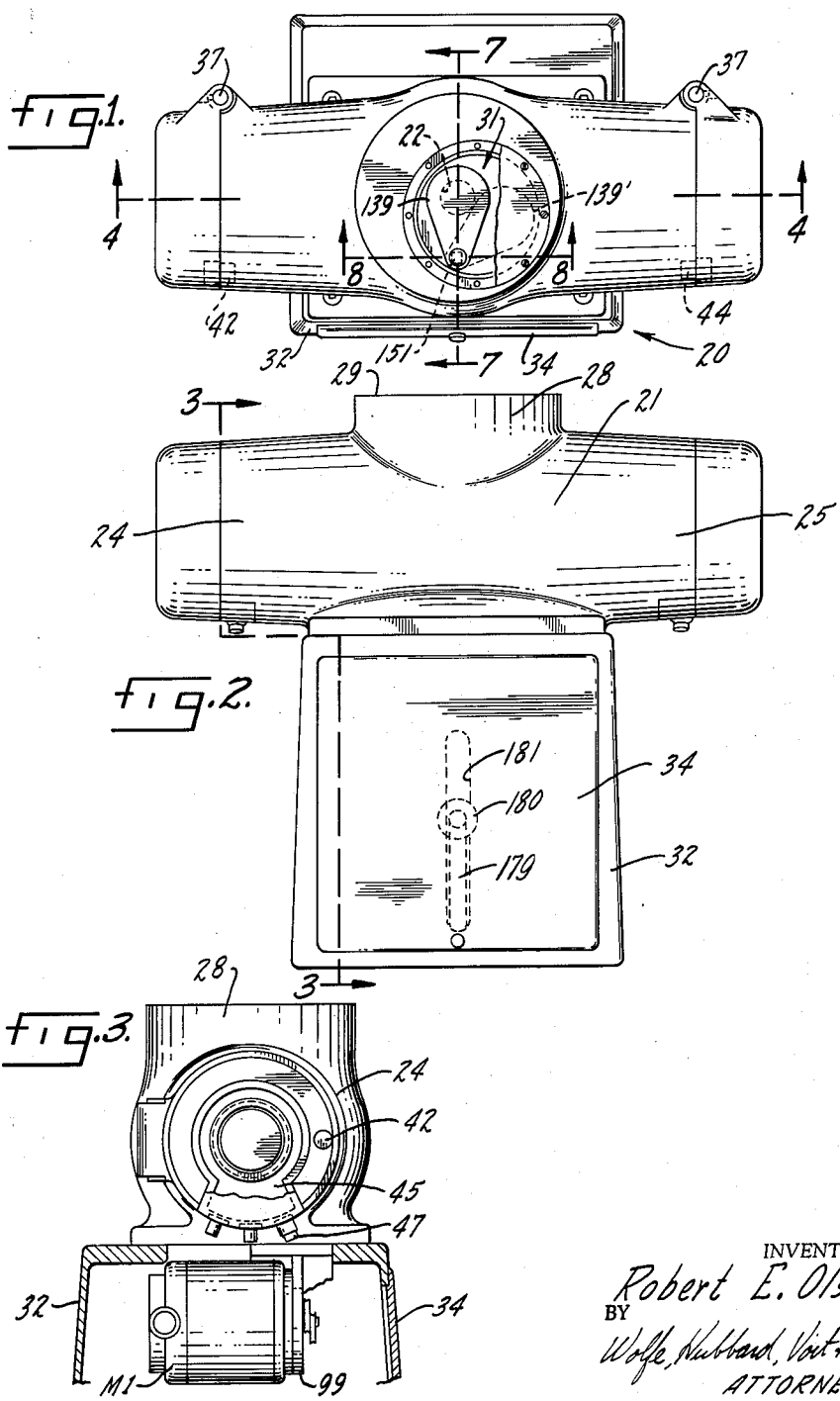

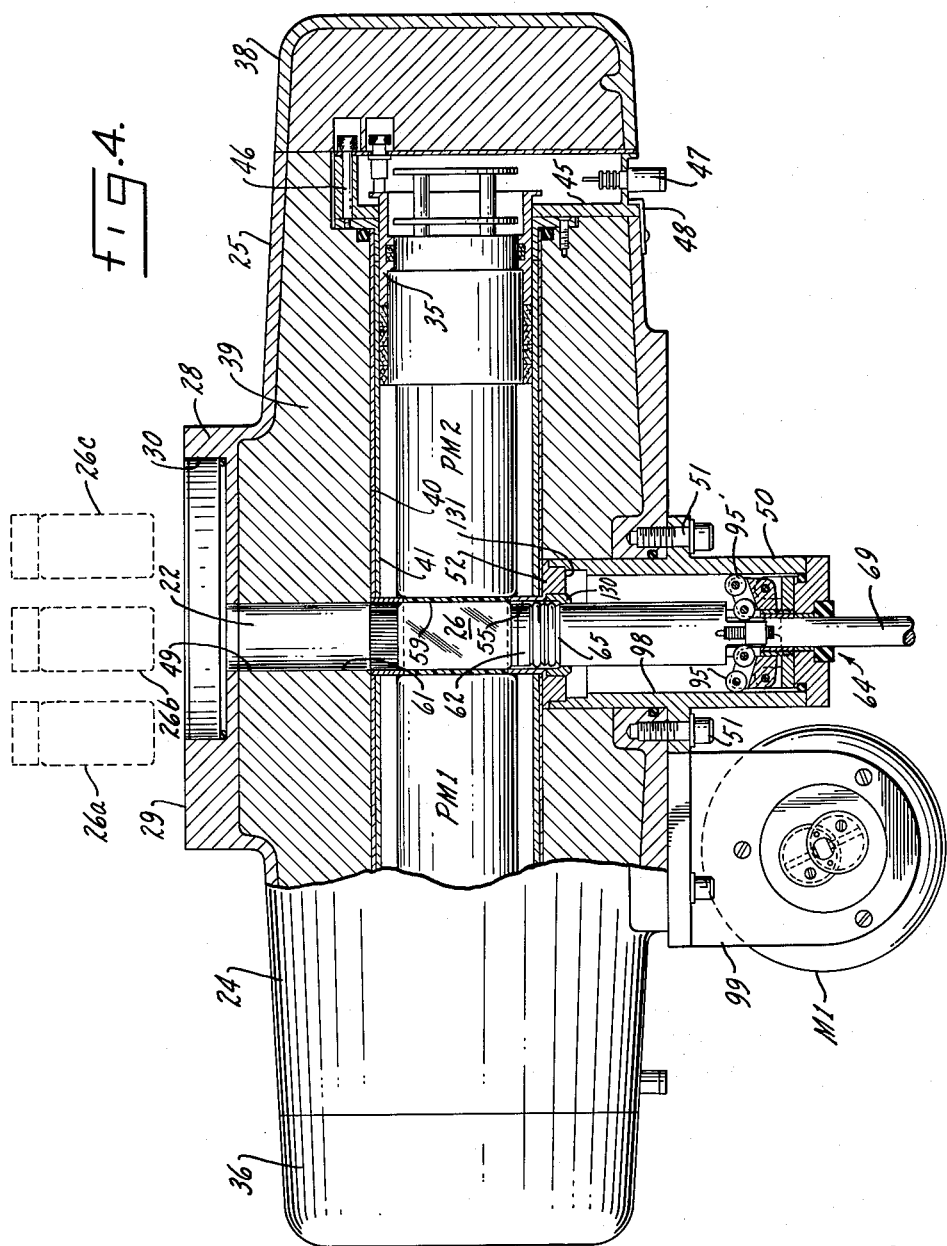

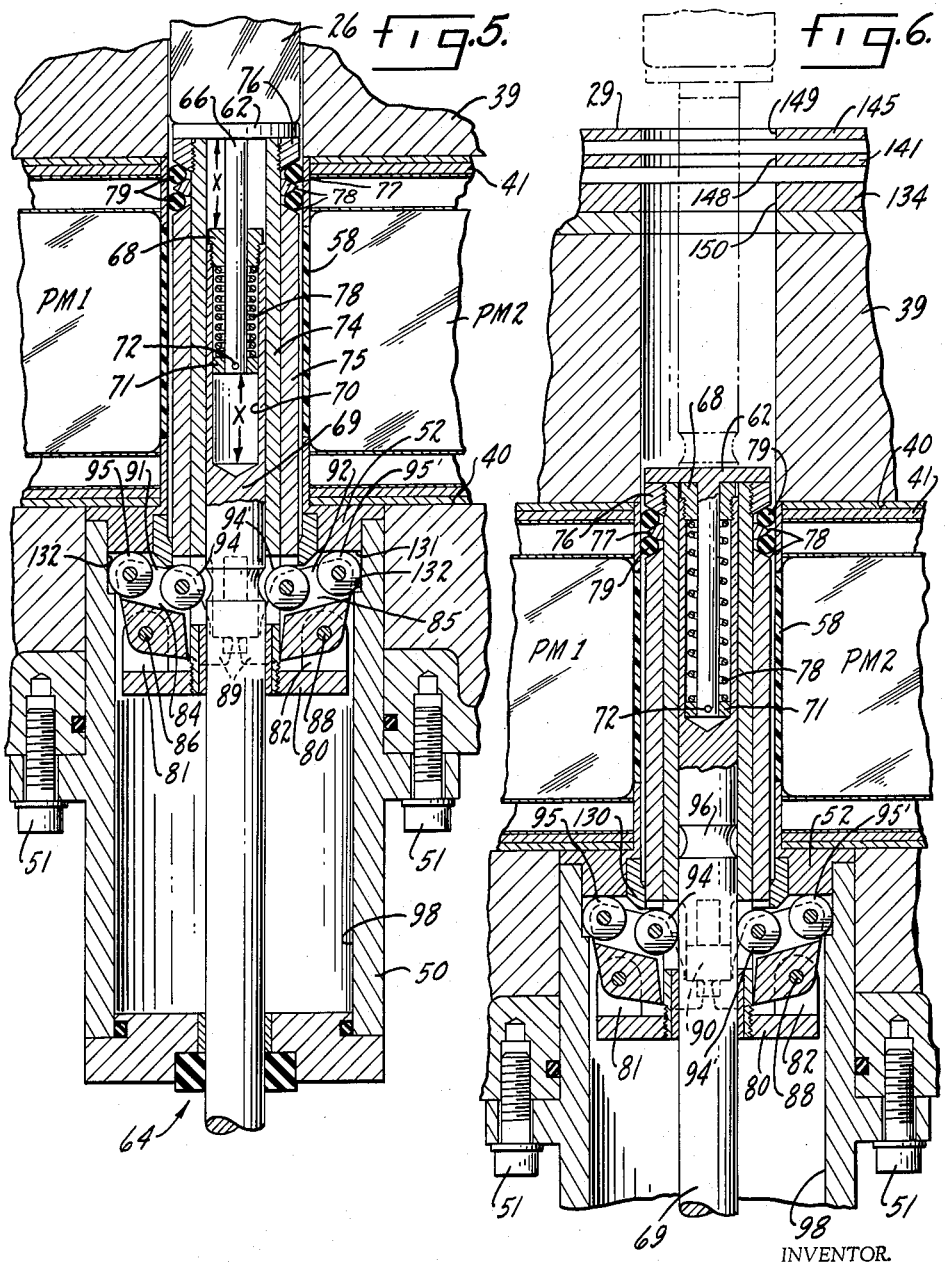

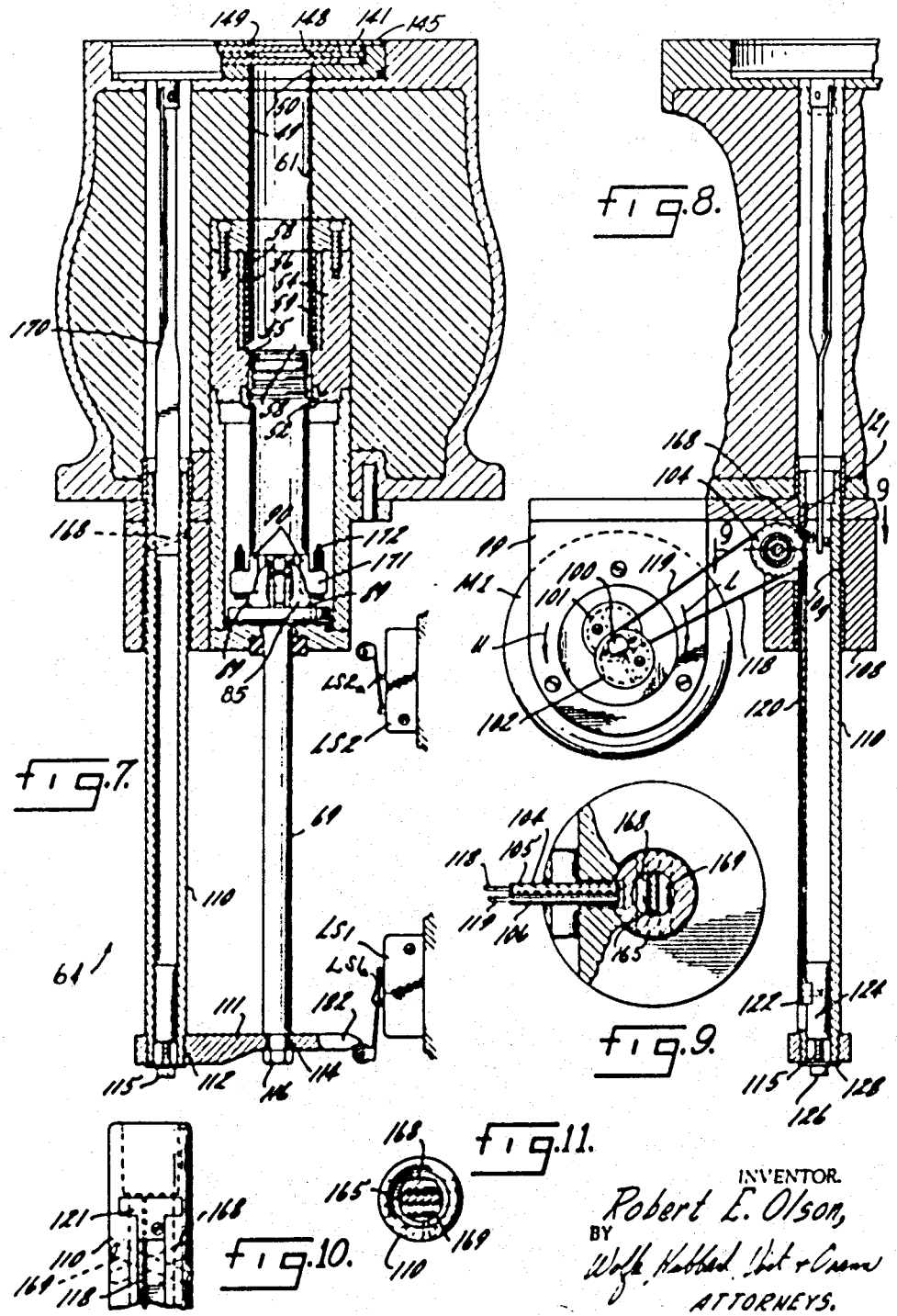

United States Patent Office 3,198,948
Patented Aug. 3, 1965

3,198,948
APPARATUS FOR MEASURING ACTIVITY
LEVELS OF RADIOACTIVE SAMPLES
Robert E. Olson, Glen Ellyn, Ill., assignor to Packard Instrument Company, Inc., Brookfield, Ill., a corporation of Illinois
Filed Apr. 15, 1963, Ser. No. 273,110
21 Claims. (Cl. 250—106)

The present invention relates in general to apparatus for detecting and measuring radioactivity emanating from a sample and, more particularly, to an improved transfer mechanism suitable for use with such detecting apparatus and adapted to introduce a sample into, and remove the sample from, a detection chamber. In its principal aspect, the invention is concerned with an improved elevator mechanism for lowering vials or the like containing a liquid scintillator and radioactive isotope to be measured into a detection chamber, and for subsequently ejecting the vial from the detection chamber upon completion of a counting cycle.

It is a general aim of the present invention to enhance the accuracy of output responses from such detecting apparatus by providing an improved shielding arrangement for excluding extraneous spectral radiation at all possible positions of the sample transport mechanism relative to the light detectors.

More specifically, it is an object of the invention to provide an improved sealing arrangement between the sample transport mechanism and the detection equipment, such a sealing arrangement characterized by its ability to provide an effective light-tight seal, yet wherein the sealing arrangement will not itself tend to produce spurious light responses which are detected by the associated light detecting equipment. While not so limited in its application, the invention will find especially advantageous use in conjunction with radioactivity detecting apparatus of the type employing a "light pipe" for maximizing the conversion of scintillation light flashes into signal information since such "light pipes" are commonly made of light transmissive plastic material which tends to produce a relatively high number of spurious counts in the detecting equipment when subjected to rubbing contact with portions of the vial or transport mechanism. Not only do plastic "light pipes" tend to produce a relatively great number of spurious signals when subject to rubbing contact, but moreover the "light pipes" also tend to produce such spurious signals for a longer period of time after being subjected to rubbing contact than do other substances.

Accordingly, an important object of the invention is to provide an improved sealing arrangement between the elevator and elevator shaft in radioactivity measuring apparatus characterized by the fact that the sealing means employed does not rub against, or contact, the elevator shaft during passage of the elevator therethrough. As a consequence of attaining this objective, the inherent tendency to produce spurious light responses which are detected by photomultipliers or the like incident to rubbing contact between sealing material and the walls of the elevator shaft is effectively eliminated.

A further object of the invention is to provide an improved sample handling device for use with radioactivity detecting apparatus, such device characterized by its ability to shift samples from and to a detection chamber while at the same time insuring that the detection chamber retains its characteristic of light-tight integrity at all times.

It is a related object of the invention to provide an improved and reliable elevator mechanism and light-tight sealing arrangement therefor characterized by their effectiveness in eliminating the danger of damage to photomultipliers or similar light transducers resulting from exposure to extraneous light sources.

In another of its important aspects, it is an object of the invention to provide an improved sample transfer mechanism which is characterized by its versatility and which can be used with substantially equal facility with virtually all of the automatic sample changers which are now available on the commercial market.

Yet another object of the invention is to provide an improved sample transfer mechanism which, while it can be used with a wide range of completely automatic sample changers, can at the same time be used in semi-automatic operations, for example, to automatically insert into, and eject from, a detection chamber, sample vials which are manually placed in a receiver on top of the detection apparatus.

It is a further object of the invention to provide an improved radiation detection apparatus which is not only characterized by its continuous light-tight integrity, but which achieves this desirable characteristic effectively with the use of a "straight-line" elevator shaft, thus making the apparatus easy to load and unload. In this connection it is an object to provide a radiation detection apparatus which provides a positive and reliable light-tight seal in operation, but which is nevertheless simple in construction, thus avoiding the relatively complex feeding mechanisms which have been used in the past to cope with the problems of spurious responses created by extraneous light sources.

It is still another object of the present invention to provide an improved automatic sample transfer mechanism which may readily be converted from automatic to manual operation simply by removing the driving motor and associated electrical limit switches and substituting, in the same mechaniism, a manually operable lever which can be grasped by the operator to both lower and raise the transfer mechanism. Thus, it is an object of the invention to provide a novel radiation detection apparatus having an automatic-manual option and in which the elevator and sealing arrangement are completely interchangeable with either the automatic or the manual version of the apparatus, making for a high degree of economy of manufacture.

Other objects and advantages of the invention will become apparent as the following description proceeds, taken in conjunction with the accompanying drawings, in which:

FIGURE 1 is a plan view of an exemplary sample transfer mechanism embodying the features of the present invention, here illustrating the mechanism with a portion of the shutter cover plate broken away and with its shutter in the closed position;

FIG. 2 is a front elevational view of the apparatus shown in FIG. 1;

FIG. 3 is a sectional view taken substantially along the line 3—3 of FIG. 2;

FIG. 4 is an enlarged fragmentary sectional view taken substantially along the line 4—4 of FIG. 1, here illustrating the transfer mechanism in the down or "sample loaded" position with the sample to be analyzed interposed between a pair of light transducers and with the shutter closed;

FIG. 5 is an enlarged, fragmentary, vertical section of a portion of the apparatus shown in FIG. 4 and illustrating details of the actuating mechanism for the light-tight sealing arrangement employed with the transfer mechanism, the apparatus here being shown during the initial portion of upward elevator movement with the shutter closed;

FIG. 6 is a view similar to FIG. 5 illustrating the elevator in solid lines during an intermediate portion of the upward shaft movement with the shutter open and, in phantom lines, the final "sample unloaded" position of the elevator;

FIG. 7 is an enlarged vertical section taken substantially along the line 7—7 of FIG. 1, and illustrating particularly the details of the shutter actuating mechanism;

FIG. 8 is a fragmentary vertical sectional view taken substantially along the line 8—8 of FIG. 1, here depicting the drive mechanism for effecting vertical movement of the elevator;

FIG. 9 is a plan view, partly in section, taken substantially along the line 9—9 of FIG. 8, and illustrating details of the shutter actuating and elevator drive arrangement;

FIG. 10 is a side elevational view of a portion of the actuating mechanism for the shutter assembly, here shown with the shutter actuating shaft removed.

FIG. 11 is a top plan view of the mechanism shown in FIG. 10, here illustrating the actuating mechanism with the actuating shaft in place;

FIG. 12 is an enlarged fragmentary sectional view taken substantially along the line 8—8 of FIG. 1 and illustrating details of the shutter assembly;

FIG. 13 is a perspective view of a typical "light pipe" used in conjunction with radiation detecting apparatus of the type shown in FIGS. 1 and 2;

FIG. 14 is a fragmentary sectional view similar to the upper portion of FIG. 7 but with the shutter open and the elevator in the "sample unloaded" position, and illustrating an exemplary vial positioning receiver which may be used with the apparatus shown in FIGS. 1 and 2 when the apparatus is being operated in either the semi-automatic or manual modes;

FIG. 15 is a fragmentary elevational view of the lower portion of an elevator mechanism embodying the invention, but here illustrating the mechanism as employed in a manually operated radiation detector; and, FIG. 16 is a schematic wiring diagram of an exemplary control circuit for the apparatus shown in FIGS. 1 and 2 when the latter is being used in the semi-automatic operational mode.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, there is illustrated in FIG. 1 an exemplary radiation and detecting measuring apparatus, generally indicated at 20, which is suitable for measuring the radioactive energy levels of test samples in accordance with the features of the present invention. As the ensuing description proceeds, it will become apparent that the present invention will find particularly advantageous use with radiation detecting equipment of the type used in detecting and measuring the activity or energy level of a test sample wherein a radioactive source is disposed within a solution containing a liquid scintillator, the latter having the characteristic property of producing light flashes when subjected to ionizing radiation. Such detectors are commonly referred to as "liquid scintillation detectors." The present apparatus 20 is primarily intended to receive and process sample vials containing such a liquid scintillator and radioactive source.

For this purpose, the apparatus 20 includes an outer housing, or shield and base assembly 21 (FIG. 2) which defines a vertically disposed detection well 22 adapted to receive sample vials one at a time in seriatim order. The shield and base assembly 21 is provided with a pair of laterally extending arms 24, 25 which serve to house proportional light transducers characterized by their ability to detect light scintillations in the sample vials and to convert such light scintillations into electrical signals, for example, voltage pulses which are proportional in amplitude to the light flash that causes the pulse. Such light transducers are well known in the art and need not be described in detail. As best shown in FIG. 4, the transducers may simply comprise a pair of photomultipliers PM1, PM2 which are mounted in oppositely disposed, coaxial, spaced relationship in the arms 24, 25 of the shield and base assembly 21. Thus, the photomultipliers are positioned on opposite sides of the detection well 22 so that sample vials 26 which are introduced into the well are mounted therebetween in light transmissive relationship therewith. The upper end of the shield and base assembly 21 comprises a generally cylindrical flange portion 28 having a planar upper surface 29 substantially coaxial with the detection well 22 and defining a cylindrical bore 30 (FIG. 4) suitable for receiving a shutter mechanism generally indicated at 31 (FIGS. 1 and 12). The lower end of the shield and base assembly includes a generally box shaped housing or stand 32 suitable for housing control components used in conjunction with the apparatus 20. As best shown in FIGS. 2 and 3, the housing 32 may be provided with an access door 34 which permits of ease in both installation and servicing.

The general organization of the apparatus is such that the sample vial 26 may be lowered into the cylindrical detection well 22 during a "count" cycle to a position where the light scintillations occurring in the sample are detected and measured by the photomultipliers PM1, PM2. Since the latter are particularly sensitive to spectral radiation, provision must be made for insuring that they are maintained in a light-tight housing at all times, so that the only light to which they are subjected is the scintillations occurring in the sample 26. It is for this reason that the upper end of the detection well is closed by a shutter mechanism 31 at all times other than when a sample is being loaded into the detection well 22 or ejected out of the detection well. While the particular means employed for delivering successive sample vials 26 to the apparatus is not critical to the present invention, those skilled in the art will appreciate that numerous types of automatic sample changers or conveyors could be employed to bring successive samples (represented diagrammatically in FIG. 4 at 26a, 26b and 26c) to a point of registration with the upper end of the detection well 22. A typical completely automatic sample changer with which the present invention finds particularly advantageous use is disclosed in the copending application of Lyle E. Packard, Roy E. Smith, Alfred A. Munn and Edward F. Polic, Serial No. 273,189, filed April 15, 1963 and assigned to the assignee of the present invention. However, while it will be understood that the present invention can find use with a wide range of different types of automatic sample changers, it is by no means exclusively limited to use with such sample changers. Indeed, the present invention will also find use in the less expensive manual versions of detection apparatus wherein successive samples are delivered to a point of registration with the detection well by hand.

Referring more particularly to FIG. 4, it will be observed that the bases of the photomultipliers (here the base of photomultiplier PM2) are received within a socket 35 and are inserted into the arms 24, 25 from the outer extremities thereof. To this end, the apparatus includes a pair of end caps 36, 38 which are hinged to the arms at 37 (FIG. 1) for pivotal movement about a vertical axis. The outer portion of the apparatus comprises a casing which may be made, for example, of aluminum and which is filled with suitable shielding material characterized by its ability to inhibit penetration of environmental background radiation. Such shielding material generally takes the form of lead and is here designated by the reference character 39. The lead shield defines a cylindrical transverse bore 40 into which the photomultipliers are coaxially inserted. Additional graded shielding means, generally indicated at 41, may be inserted into the bores 40 in surrounding relationship to the photomultipliers, although it will be understood that such additional shielding means is not critical to the present invention. For securing the end caps 36, 38 in place, suitable magnets, generally indicated at 42 and 44 (FIGS. 1 and 3), are mounted in the housing at a point generally diametrically opposite to the pivoted hinged connection. Thus, when it is necessary to replace the photomultipliers, or when other servicing operations are required, it is merely necessary to pivot the end caps about their hinge pins so as to expose the ends of the sockets 35 and the electrical connections to the photomultipliers. As best illustrated by reference to FIGS. 3 and 4 conjointly, the graded shielding 41 is retained in place by means of a key-hole shaped casting 45 having a plurality of electrical connectors 47 projecting generally radially therefrom, the connectors serving to permit coupling of the photomultipliers to a suitable source of high voltage (not shown). As here illustrated, the key-hole casting 45 may be held in place by means of a plurality of bolts, one of which is shown at 46, or, alternatively, simply by the use of a clip of the type shown at 48.

The detection well 22 includes an upper cylindrical bore 49 formed in the housing and the lead shield 39. An enlarged tubular sleeve 50 extends upwardly into the housing and is secured in place by means of suitable threaded fasteners 51. The upper end of the tubular sleeve 50 is stepped, and serves to support a generally cylindrical collar 52, the latter having an upwardly extending generally rectangular flange 54 (FIG. 7). A vertical bore 55, having generally the same diameter as the bore 49, is formed in the collar 52 and flange 54, the bores 49 and 55 being disposed in coaxial relationship. The flange 54 is further provided with a transverse slot 56 which extends entirely therethrough and which defines at its opposite ends a pair of windows adapted to be positioned adjacent the light receptive ends of the photomultipliers PM1 and PM2.

In order to maximize the conversion of light energy into electrical energy, a light pipe 58 is positioned in the slot 56, the light pipe defining a cylindrical vertical bore 59 coaxial with, and having the same diameter as, the bores 49 and 55. As best illustrated in FIG. 13, the light pipe 58 comprises a pair of complementary mating blocks 58a, 58b of light transmissive thermoplastic material having complementary abutting faces shaped to define the bore 59. Thus, the block is generally cube-shaped having six outer walls 58c–58h. The oppositely disposed vertical walls 58g and 58h are coupled to the photomultipliers PM1 and PM2 respectively in light transmissive relationship therwith when the block is positioned in the slot 56. The remaining external walls 58c–58f are either painted or coated with a light reflective material 60 which serves to insure that all light scintillations occurring in the sample 26 are reflected towards the light sensitive elements in the photomultipliers PM1, PM2.

As best illustrated in FIGS. 4 and 7, when the foregoing components are assembled, the bores 49, 55 and 59 define a substantially continuous elevator shaft 61 which houses an elevator platform 62 adapted to support the sample vials 26 and to effect vertical reciprocation thereof into and out of the count chamber defined by the light pipe 58.

In accordance with one of the important aspects of the present invention, provision is made for effecting vertical reciprocation of the elevator platform 62 within the elevator shaft 61 so as to selectively load and unload sample vials 26 into and out of the count chamber defined by the light pipe 58, together with improved means for rendering the apparatus light-tight at all times and at all vertical positions of the elevator platform 62 in the apparatus, yet wherein there is no rubbing contact with the light pipe as the elevator mechanism passes therethrough. To this end, the elevator mechanism, generally indicated at 64 in FIG. 4, includes a novel sealing arrangement 65 which is normally inoperative and is rendered operative as an incident to upward movement of the elevator platform 62 after the latter has moved entirely through the bore 59 in the light pipe 58, thus insuring that rubbing contact between the sealing means and the light pipe is prevented.

Referring to FIG. 5, it will be observed that the transfer or elevator mechanism 64 includes a disc-shaped platform 62 having an integral downwardly projecting rod 66, the rod being slidably received in a cap 68 which is threadably connected with an elevator actuating shaft 69 having an elongate bore 70 formed therein. A collar 71 is pinned, as shown at 72, to the lower end of the downwardly projecting rod 66, the collar being slidably received within the bore 70 of the elevator actuating shaft 69. Surrounding the shaft 69 are a pair of concentric sleeves 74, 75, the inner sleeve 74 having an annular collar 76 threadably coupled to its upper end and defining, with the sleeve, a point of support for the elevator platform 62. For the purpose of holding the platform 62 in snug conformity to the upper end of the inner sleeve 74 and its associated collar 76, a compression spring 78 is interposed between the base of the cap 68 and the collar 71. The outer sleeve 75 terminates at its upper end short of the collar 76. A wedge-shaped annular slide 77 (FIG. 6) is interposed between the collar 76 and the outer sleeve 75 and defines therewith a pair of frusto-conical, annular grooves 78 adapted to receive a pair of O-rings 79 made of deformable sealing material.

In carrying out the present invention, provision is made for permitting relative movement between the inner and outer sleeves 74, 75, respectively, as the elevator mechanism 64 is raised so as to clamp the O-rings 79 between the wedge-shaped faces of the collar 76, slide 77 and outer sleeve 75, thus deforming the sealing rings 79 and urging them laterally outward into intimate sealing engagement with the wall of the elevator shaft 61. To this end, the inner sleeve 74 has rigidly secured to its lower end an annular mounting platform 80 having a pair of diametrically opposed upwardly extending brackets 81, 82. A pair of generally horseshoe-shaped links 84, 85 (best illustrated by reference to FIGS. 5 and 7 conjointly) are pivotally mounted at 86, 88, respectively, to the brackets 81, 82. The lower ends of the links each terminate in a pair of force transmitting links 89 which partially surround the elevator shaft 69 and which are adapted to support a pair of diametrically opposed, downwardly projecting tangs 90 integral with the lower end of the outer sleeve 75. The links 84, 85 are bifurcated to form vertically disposed slots 91, 92, respectively, the links supporting inner rollers 94, 94', respectively, and outer rollers 95, 95', respectively, with the rollers 94, 95 journaled for rotation in the slot 91 and the rollers 94', 95' journaled for rotation in slot 92. The elevator actuating shaft 69 is provided with an undercut annular groove 96, (FIG. 6), dimensioned to receive the inner rollers 94, 94' when the elevator is in its lowermost position (as shown in FIGS. 4 and 7). In this condition, rollers 94, 94' are maintained snugly within the groove 96 while the rollers 95, 95' engage and roll upon the inner wall 98 of the sleeve 50.

For the purpose of effecting vertical movement of the elevator shaft 69, a reversible motor M1 of conventional type is rigidly supported by the shield and base assembly 21 on a motor mounting bracket 99 (FIG. 4). As best illustrated in FIG. 8, the output shaft 100 of the motor M1 has affixed thereto a pair of pulleys 101, 102, the pulleys each being eccentrically mounted relative to the drive shaft 100. An idler pulley 104, having a pair of grooves 105, 106 (FIG. 9), is journalled for rotation in a block 108 which forms part of the frame of the apparatus and which defines a bore 109 for slidably receiving a tubular drive shaft 110. As best shown in FIG. 7, the drive shaft 110 and the elevator actuating shaft 69 are held in spaced, parallel relation by means of a transverse bracket 111 which is snugly fit on undercut portions 112, 114 of the drive shaft 110 and elevator actuating shaft 69, respectively, and which is retained in place by means of threaded fasteners 115, 116.

As best illustrated by reference to FIGS. 8 and 9 conjointly, the motor M1 is operatively connected to the drive shaft 110 by means of a pair of cables 118, 119 which are respectively secured adjacent one end to the pulleys 101, 102 and which are respectively trained about the idler pulley 104 and secured to opposite ends of the drive shaft. As shown in the exemplary apparatus, the cable 118 is affixed to the pulley 101 and passes under the idler pulley 104 and through the groove 105, extending upwardly in an elongate longitudinal key-way slot 120 formed in the drive shaft 110. The free end of the cable 118 is rigidly secured to a T-shaped connector 121 (FIG. 10) which is fixedly mounted on the upper end of the drive shaft 110. Similarly, the cable 119 is wound about and secured to the eccentrically mounted pulley 102. The free end of the cable 119 extends over the idler pulley 104 in the groove 106 formed therein and passes downwardly through the key-way slot 120 where it is rigidly secured to a mounting lug 122 carried on a plug 124 which is slidably received within the tubular drive shaft 110. For tensioning the cable 119, the plug 124 is threadably coupled to the bolt 115 which is provided with an enlarged head 126. The bolt extends upwardly through a washer-like end member 128 which is bottomed on the lower end of the drive shaft 110. Thus, when the threaded fastener 115 is tightened, the plug 124 is moved downwardly in the tubular drive shaft 110 so as to tension the cable 119.

Referring to FIG. 8, it will be observed that when the motor M1 is energized to rotate in a counterclockwise direction as indicated by the arrow U, the cable 119 will be wound about or "pay on" its pulley 102, while at the same time the cable 118 will "pay off" its pulley 101. When this happens the drive shaft 110 is driven upwardly, thus serving to drive the elevator actuating shaft 69 upwardly and unloading the sample 26. On the other hand, when the motor M1 is energized for rotation in a clockwise direction as represented by the arrow L, the cable 119 "pays off" its pulley 102 while the cable 118 is wound about or "pays on" its pulley 101. In this latter instance, the drive shaft 110 is driven downwardly. Since the drive shaft 110 and elevator actuating shaft 69 are rigidly connected, downward movement of the former moves the latter downwardly to load a sample 26 into the count chamber defined by the bore 59 in the light pipe 58.

In carrying out the present invention, means are provided for effecting relative movement between the inner and outer sleeves 74, 75 during an "unload" cycle, (i.e., when the elevator actuating shaft is moved upwardly to eject a sample 26), thus serving to compress the O-rings 79 and effecting a light-tight seal. To this end, when the motor M1 is energized during an "unload" cycle, the elevator actuating shaft 69 starts to move upwardly from the position shown in FIG. 4. During the initial portion of the upward movement, the rollers 95, 95' are snugly engaged with the inner surface 98 of the tubular sleeve 50 and thus serve to rigidly clamp the rollers 94, 94' in operative driving relationship with the groove 96 formed in the elevator actuating shaft 69. Since the sleeve 50 prevents outward movement of the rollers 95, 95', the rollers 94, 94' cannot leave the groove 96 in the elevator actuating shaft and, consequently, a vertical drive force is transmitted through the rollers 94, 94' to the links 84, 85 and thence to the mounting plate 80. Consequently, the sleeves 74, 75 slide upwardly as a unit within the elevator shaft 61. However, as best illustrated in FIG. 4, a positioning guide ring 130 mounted in the collar 52 serves to guide the sleeves during their upward movement, thus maintaining the outer sleeve 74, the collar 76, platform 62 and O-rings 79 out of contact with the defining walls of the elevator shaft 61. Since these elements do not contact the walls of the elevator shaft, and in particular, do not contact the thermoplastic material of the light pipe 58, there is no tendency to produce light or other effects which may cause spurious output signals from the photomultipliers PM1–PM2. The arrangement is such that the sealing O-rings 79 are maintained out of contact with the walls of the elevator shaft 61 during their entire transit through the light pipe 58. Of course, during the initial portion of the "unload" cycle, it is not necesary that a light-tight seal be effected by the O-rings 79 since the shutter assembly 31 (FIG. 12) is still closed.

In keeping with the invention, provision is made for pivoting the links 84, 85 outwardly about their respective pivot points 86, 88, thus serving to urge the outer sleeve 75 upwardly relative to the inner sleeve through coaction of the opposed pairs of lugs 89 and the tangs 90. To this end the rollers 95, 95' are journalled to links 84, 85, respectively, at points located outwardly relative to the pivot connections 86, 88. The arrangement is such that as the rollers 95, 95' initially contact the stop surface 131 defined by the lower end of the collar 52, a force is created which tends to urge the rollers outwardly into an annular groove 132 formed at the upper end of the tubular sleeve 50 (FIG. 5). When this occurs, the links 84, 85 pivot outwardly about their respective pivot points 86, 88 and the rollers 94, 94' are freed from the groove 96 formed in the elevator actuating shaft 69, thus permitting continued upward movement of the latter.

It will be appreciated from the foregoing description, that as the elevator actuating shaft 69 moves upwardly under the influence of the continuously driven motor M1, at the instant that the rollers 95, 95' strike the stop surface 131 defined by the collar 52, continued vertical movement of the mounting platform 80 and the integral inner sleeve 74 terminates. Thus, the collar 76 disposed on the upper end of the inner sleeve 74 defines a stop surface for the O-rings 79. As the elevator actuating shaft 69 continues to move upwardly, the links 84, 85 pivot outwardly with the rollers 95, 95' being received within the annular groove 132 formed at the upper end of the sleeve 50. As a consequence of this movement, the opposed pairs of force transmitting links 89, 89' are positively urged upwardly into engagement with the lower surface of the downwardly depending tangs on the outer sleeve 75, thus shifting the outer sleeve upwardly relative to the inner sleeve and deforming the O-rings 79 into light-tight sealing relationship with the walls of the elevator shaft 61 at a point well above the light pipe 58. Of course, as the elevator actuating shaft 69 continues to move, the groove 96 formed therein moves upwardly out of registration with the rollers 94, 94' and consequently, the rollers begin to ride on the surface of the elevator actuating shaft 69 so as to lock the links 84, 85 in their outward pivoted condition and preventing release of the compressive sealing force exerted on the O-rings. Moreover, the tendency to create a compressive sealing force is enhanced by the provision of the compression spring 78 which exerts downward forces on the inner sleeve 74 and collar 76 tending to oppose the forces created by the upwardly moving outer sleeve 75.

At this point in the "unload cycle," the elevator actuating shaft 69 is moving upwardly and the sample vial 26 supported on the elevator platform 62 is disposed within the bore 49 defined by the housing and lead shield 39. The upper end of the sample vial is still disposed beneath the shutter mechanism 31 (FIGS. 7 and 12) and since the latter is still closed, provision must be made for terminating vertical movement of the sample vial 26 until the shutter mechanism is open. Of course, since the sealing rings 79 are now in intimate light-tight sealing relationship with the walls of the elevator shaft 61, opening of the shutter mechanism 31 will not subject the photomultipliers to an external source of spectral radiation.

For the purpose of permitting the drive shaft 110 to continue upwardly to actuate the shutter mechanism 31 while at the same time maintaining the sample vial 26 in substantially the same position as illustrated in FIG. 5, the exemplary elevator mechanism 64 includes a "lost motion" connection which allows the elevator actuating shaft 69 to continue upwardly without effecting further upward movement of the platform 62. To this end, and referring to FIG. 5, it will be observed that at this point in the "unload cycle" of operation, the bottom surface of the collar 71 which is coupled to the elevator rod 66 is spaced from the bottom of the cylindrical bore 70 by a distance $x$. In like manner, the top surface of the cap 68 is spaced from the bottom of the platform 62 by a distance $x$. The compression spring 78 is still compressed, and thus tends to urge the rod 66 and bore 70 into full telescoped relation—that is, the spring 78 tends to hold the platform 62 in snug conformity to the upper end of the stationary inner sleeve 74 while the elevator actuating shaft 69 moves upwardly from the position shown in FIG. 5 to the solid line position shown in FIG. 6. It is during this period of vertical elevator actuating shaft movement that the shutter mechanism 31 is opened and, thereafter, continued upward movement of the elevator actuating shaft 69 serves to directly drive the elevator platform 62 through coaction with the cap 68 from the solid line position shown in FIG. 6, to the upper position represented by the phantom lines wherein the elevator platform 62 is disposed well above the upper surface 29 of the shield and base assembly.

For the purpose of providing an effective light-tight seal for the detection apparatus 20 when the apparatus is in a counting cyle of operation, the exemplary shutter mechanism shown in FIGS. 1, 7 and 12 provides an effective tortuous path which is, for all practical purposes, substantially impenetrable by spectral radiation when the shutter is in the closed position. As best shown in FIG. 12, the shutter mechanism 31 includes a metallic cylindrical base 134 which is positioned within the bore 30 in the cylindrical flange portion 28 at the top of the shield and base assembly, an O-type sealing ring 135 being interposed between the bottom of the bore 30 and the bottom of the base 134. The base 134 is formed with an annular upstanding flange 136 which defines a cavity 138 into which the shutter blades are positioned. In the illustrative form of the invention, three shutter blades are provided, there being a pair of pivotally mounted movable blades 139, 140 which are sandwiched about a stationary blade 141. As best illustrated in FIG. 12, it will be noted that the stationary blade 141 is supported adjacent its outer perimeter on an annular spacer 142, which may conveniently take the form of a metallic ring. The lower movable blade 140 is interposed between the bottom surface of the stationary blade 141 and the bottom of the cavity 138. A second annular spacer ring 144 rests upon the top of the stationary blade 141 about the periphery thereof, with the upper movable blade 139 adapted to slide between the upper surface of the fixed blade 141 and the lower surface of a cover plate 145. As here illustrated, the upper surface of the spacer ring 144 bottoms against the lower surface of the cover plate 145 and a plurality of threaded fasteners 146 (FIG. 1) are provided for clamping the entire assembly into intimate face-to-face contact.

Referring to FIGS. 1, 6 and 7, it will be observed that the fixed stationary blade 141 has formed therein an opening 148 while the cover plate 145 has a similar opening 149. The openings 148, 149 in the fixed blade 141 and cover plate 145 are registered with one another and with an opening 150 formed in the base 134, the openings defining a continuation of the elevator shaft 61 and permitting passage of a sample vial 26 therethrough when in the open condition as shown in FIG. 6.

In keeping with the invention, the movable blades 139, 140 are mounted (FIG. 1) for pivotal movement about a point 151 from the solid line position shown for blade 139 (a position totally closing the upper end of the elevator shaft) to the dotted line position 139' (totally opening the elevator shaft and permitting passage of a sample therethrough). When in the closed position as shown in FIG. 7, the light path through the shutter mechanism is a substantially tortuous path defined by the coacting faces between the top plate 145 and the blade 139; the blade 139 and the stationary blade 141; the stationary blade 141 and the movable blade 140; and finally, the movable blade 140 and the base 134. To facilitate sliding movement of the blades relative to one another, they are preferably made of a material having a relatively low coefficient of sliding friction, for example, a relatively hard plastic material.

In order to effect pivotal movement of the movable blades 139, 140 in unison, the blades are provided with square openings 152 (FIG. 12) through which extends a square stub 154 on a drive shaft 155. A cylindrical spacer ring 156 having a square opening 158 formed therein is rotatably mounted in an opening 159 formed in the fixed blade 141. A button 160, having a cap portion 161 received within a recess 162 formed in the cover plate 145, passes downwardly through the stub shaft 154 and is rigidly secured to the drive shaft 155 by means of a threaded fastener 164, thus serving to clamp the two movable blades 139, 140 together and against the annular spacer 156. Referring to FIG. 1, it will be observed that in order to shift the movable blades 139, 140 between the positions opening and closing the elevator shaft, it is necessary to swing the blades about the pivot point 151 through an angle of approximately 50°.

In accordance with another of the important aspects of the present invention, provision is made for effecting pivotal movement of the movable shutter blades as an incident to upward movement of the drive shaft 110 and during the time that the elevator actuating shaft 69 is moving through its "lost motion" connection to the elevator platform. To this end, a flat shutter actuating shaft 165 extends upwardly into the tubular drive shaft 155 and is rigidly and nonrotatably secured thereto by means of a transversely extending threaded fastener 166. The arrangement is such that rotation of the shaft 165 about its vertical axis through an angle of approximately 50° will serve to pivot the movable blades 139, 140 through angular increments sufficient to open and close the upper end of the elevator shaft 61.

To effect such angular rotation of the shaft 165 as an incident to upward movement of the elevator drive shaft 110, the lower end of the shaft 165 extends downwardly into the upper end of the tubular drive shaft 110 and, as best illustrated in FIG. 9, passes through a pair of dowel pins 168, 169 which are rigidly secured in slightly spaced apart relation to the drive shaft 110 and extend transversely across the bore defined thereby. The dowel pins 168, 169 are slightly inclined in opposite directions as shown in FIG. 10. The downwardly extending portion of the shutter actuating shaft 165 is provided intermediate its ends with a smooth, twisted portion 170, the amount of the twist being sufficient so that the upper and lower portions of the actuating shaft 165 are twisted approximately 50° relative to one another. The arrangement is such that during upward movement of the elevator actuating shaft 69 and the drive shaft 110, the inclined dowel pins 168, 169 will begin to cooperate with the twisted portion 170 of the actuating shaft 165 at the same time that the elevator actuating shaft starts to move through its "lost motion" connection. As the drive shaft 110 and the elevator actuating shaft 69 continue upwardly through a linear distance $x$ corresponding to the permissible amount of "lost motion" provided by the connection shown in FIGURE 5, the dowel pins 168, 169 will completely traverse the twisted portion 170 of the shaft 165. Since the dowel pins 168, 169 are nonrotatably connected to the drive shaft 110 which in turn is a nonrotatable element, passage of the dowel pins 168, 169 over the twisted portion 170 of the actuating shaft serves to cam the shaft through the necessary angular increment of approximately 50°, thus serving to shift the shutters from the solid line position 139 shown in FIGURE 1 to the dotted line position 139'. At this point, the shutter mechanism is completely open and when the upper end of the cap 68 bottoms on the lower surface of the elevator platform 62, continued upward movement of the shaft 69 will serve to raise the sample vial upwardly through the now open shutter mechanism to the phantom position shown in FIG. 6.

In carrying out the present invention, provision is made for insuring that the elevator actuating shaft 69 is moving upwardly at relatively slow speed with high torque at the instant that the actuating mechanism for the sealing ring 79 is activated. To accomplish this, the pulleys 101, 102 (FIG. 8) are eccentrically offset from the axis of the drive shaft 100 on the motor M1. The arrangement is such that at the beginning of a "sample unload" cycle, the cables 118, 119 are winding on and off their respective pulleys 101, 102 at tangential points disposed relatively short radial distances from the axis of the motor drive shaft 100. Thus, initially, the drive shaft 110 moves at a relatively low speed with high torque. As the drive shaft 100 moves through 180° of revolution, the radial distances from which the cables "pay on" and "off" their respective pulleys increases to a maximum value and, at that maximum value, minimum torque is applied, but the elevator actuating shaft 69 and drive shaft 110 are moving at their maximum speeds. During the second 180° of motor shaft revolution, the speed of vertical movement of the actuating shaft 69 and elevator drive shaft 110 progressively decreases and the torque progressively increases. The pulleys 101 and 102 are preferably dimensioned such that just prior to the time that the motor shaft 100 completes its first full revolution, the rollers 95, 95' (FIG. 5) engage the stop surface 131 on the collar 52 and the compressive forces which tend to deform the O-rings 79 are initially exerted. At this point, the drive shaft 110 and elevator actuating shaft 69 are moving upwardly at slow speed with high torque. When the motor shaft 100 has completed its first revolution, the O-rings 79 are totally expanded into light-tight sealing engagement with the elevator shaft 61, and the concentric sleeves 74, 75 are locked in position.

The motor M1 remains energized and its output shaft 100 starts to move through its second complete revolution. During the initial portion of the second complete revolution, the "lost motion" action previously described comes into play. Thus, at this time the dowel pins 168, 169 are located immediately below the twisted area 170 of the shutter actuator shaft 165. During the initial portion of the second revolution of the motor shaft 100, the dowel pins 168, 169 engage the twisted portion 170 of the shutter actuator shaft 165 and coact therewith to twist the shaft through an angle of 50°. Upon completion of the angular rotation of the shutter actuator shaft 165, the dowel pins 168, 169 are disposed immediately above the twisted portion 170, and during the balance of the second revolution of the motor shaft 100 they continue to ride upwardly along the upper nontwisted portion of the shaft 165. In the "up" position of the elevator mechanism (when the shutter is open and the sample 26 has been projected above the level of the shutter as shown in phantom in FIG. 6), the cables 118, 119 are "payed off" a short radius as measured from drive shaft 100, thus tending to increase the natural braking power of the motor M1 and serving to prevent downward drift of the elevator mechanism 64.

Of course, those skilled in the art will appreciate that during a "sample load" cycle when the elevator mechanism is moving downwardly, the actuation of the shutter mechanism 31 is substantially the same as described above. However, in this instance the dowel pins 168, 169 will serve to cam the shaft 165 in the opposite direction to close the shutter mechanism 31. During this cycle of operation, the dowel pins will initially engage the twisted portion 170 of the shaft 165 at approximately the same time that the elevator platform 62 bottoms on the upper end of the inner sleeve 74. Consequently, during the time that the dowel pins traverse the twisted portion 170 to close the shutter mechanism 31, the elevator actuating shaft 69 moves downwardly a distance $x$ corresponding to its "lost motion" connection. Thus, the O-ring seals 79 remain expanded in light-tight sealing relationship with the elevator shaft 61 until the shutter mechanism 31 is completely closed.

Referring to FIG. 7, it will be noted that the downwardly extending tangs 90 integral with the outer sleeve 75 are provided with laterally projecting bosses 171, each of which serves to support an upwardly extending, spring loaded pin 172. The arrangement is such that when the elevator shaft moves upwardly and the links 84, 85 are pivoted outwardly, the pin 172 bottoms on the stop surface 131 (FIG. 5) and is compressed against the bias provided by the springs. Consequently, as the elevator shaft returns to the position shown in FIG. 5, the spring loaded pins 172 tend to urge the bosses 171 downwardly relative to the stop surface 131. This serves to pivot the links 84, 85 and return the rollers 94, 94' inwardly into operative engagement with the groove 96 formed in the elevator actuating shaft. Thus, as the elevator actuating shaft 69 continues downwardly to its "sample loaded" position, the rollers 95, 95' are pivoted inwardly and ride along the inner surface 98 of the tubular sleeve 50. This serves to again lock the inner and outer sleeves 74, 75 into operative engagement with the elevator actuating shaft 69 and, the entire assembly moves downwardly as a unit. At the instant that the spring loaded pins 172 urge the links 84, 85 inwardly, the outer sleeve 75 moves downwardly relative to the inner sleeve 74, thus freeing the O-rings 79 from the deforming forces and permitting them to return to their normal nonexpanded position. Therefore, as the elevator mechanism 64 moves downwardly, the O-ring seals are maintained out of contact with the plastic light pipe 53, thus insuring that no spurious signals are produced in the photomultipliers as a result of rubbing contact with the seals, and at the same time substantially prolonging the life of the seals since they are not subjected to wear.

Referring to FIG. 14, there is illustrated an exemplary vial positioning receiver 174 which will find particularly advantageous use with radiation and detector assemblies of the type shown in FIGS. 1 and 2 when the latter are being used in either semi-automatic or manual modes of operation. Thus, the position receiver 174 includes a cylindrical base portion 175 having an upwardly extending tubular sleeve portion 176 dimensioned to receive a sample vial 26. When the elevator platform is in its uppermost position, the upper end of the vial projects slightly above the top of the tubular projection 176, thus facilitating insertion of and removal of the vials. The receiver 174 is preferably rigidly secured to the upper end or cylindrical flange 28 of the shield and base assembly 21 by means of a plurality of threaded fasteners, one such fastener 173 being illustrated in FIG. 14. It will be appreciated that the provision of a positioning receiver of the type here shown permits the technician to accurately position the sample vial on the elevator platform 62 so that there is no chance of the vial "cocking" as the elevator platform moves down into the shaft during a loading cycle.

Referring to FIG. 15, there is illustrated a fragmentary portion of a modified form of detecting apparatus which can be used with an elevator shaft seal and shutter actuating mechanism embodying the features of the present invention. However, in this form of the invention, vertical "load" and "unload" movement of the elevator and shutter actuating mechanism is achieved by the simple expedient of providing a manual operating lever 179 having an operating handle 180 formed thereon, the lever being rigidly secured to the bracket 111.

In order to accommodate vertical movement of the operating lever 179 in the manual form of the invention, it is merely necessary to form an elongate vertical slot in the access door 34 of the apparatus 20, such a slot being diagrammatically represented in FIG. 2 at 181. Since this form of the invention is manually operated, it is possible to eliminate the elevator motor M1 and its associated electrical control circuits, together with the cable drive arrangement shown in FIG. 8. However, in all other respects the apparatus is substantially identical to that shown and described in connection with FIGS. 1–14. Thus, those skilled in the art will appreciate that the elevator mechanism and its associated sealing arrangement, together with the shutter actuating mechanism previously described, are completely interchangeable with the same components in the manual version of the apparatus shown in FIG. 15.

Referring now to FIGS. 7 and 16 conjointly, a brief description of a typical "sample unload" and "sample load" cycle of operation will be set forth. Assuming that the exemplary elevator mechanism 64 is in its down position and that the sample vial 26 positioned in the detection chamber has undergone a complete counting operation for determining the activity level of the radioactive source therein, the operator is now ready to remove the particular sample 26 from the detector mechanism 20 and to substitute therefor a new sample vial 26. To this end, it is merely necessary to turn the mode selector switch 184 (FIG. 16) to the "unload" terminal. When this is done, an energizing circuit will be completed from the terminal L2 of a suitable A.-C. source (not shown) through the "run" contacts of the upper limit switch LS2, and thence to the "unload" terminal of the elevator motor M1, the motor also being connected to the terminal L1 of the A.-C. source. Under these conditions the motor M1 will be energized and will start to rotate in a counterclockwise direction (as viewed in FIG. 8) to raise the drive shaft 110 and the elevator actuating shaft 69. As the elevator mechanism 64 starts upwardly, a cam actuator 182 integral with the bracket 111 will release the actuator LS1$_a$ of the lower limit switch LS1, thus permitting the latter to return to its normal condition with the "run" contacts closed and the "stop" contacts open. As the elevator mechanism 164 approaches its upper limit position (the shutter mechanism 31 having been actuated by the elevator drive shaft 110), the cam actuator 182 engages the actuator LS2$_a$ of the upper limit switch LS$_2$, thus shifting the latter to open the normally closed "run" contacts and close the normally open "stop" contacts. When this occurs, the elevator motor M1 is de-energized and the sample vial 26 is in the "sample ejected" position. The operator now simply replaces that sample with another sample vial and switches the mode selector switch 184 to the "load" terminal. This serves to complete an energizing circuit for the elevator motor M1 from the A.-C. terminal L2 through the now closed "run" contacts of the lower limit switch LS1 and through the load terminal of the elevator motor back to the A.-C. terminal L1. The motor now runs in a clockwise direction (as viewed in FIG. 8) to again return the elevator actuating shaft to its lowermost position. At the same time the shutter mechanism is closed as the drive shaft 110 moves downwardly. When the elevator mechanism 64 reaches its lowermost limit position, the cam actuator 182 again engages and depresses the actuator LS1$_a$ of the lower limit switch LS1, thus breaking the "run" contacts and making the "stop" contacts thereof. The motor M1 is again deenergized and the apparatus is now ready for another "count cycle."

I claim as my invention:

1. A light-tight sample transfer mechanism comprising, in combination, a stationary detection well, shutter means for effecting a light-tight seal adjacent the upper end of said well, an elevator disposed within said well, sealing means carried by said elevator for effecting a light-tight seal with the wall of said well during periods when said shutter means are open, drive means for effecting vertical movement of said elevator, said sealing means being normally spaced from the wall of said well as said sealing means are carried vertically through said well so as to be free of rubbing contact therewith, and means for effecting deformation of said sealing means outwardly into engagement with the wall of said well as an incident to vertical movement of said elevator so as to establish a light-tight seal between said elevator and the wall of said well.

2. An elevator mechanism for use with a light-tight radiation detection chamber, comprising, in combination, a cylindrical detection well defining a fixed stop, an elevator actuating shaft slidably mounted in said well, a pair of concentric sleeves slidably mounted on said shaft, said concentric sleeves defining an annular slot formed between said sleeves and communicating with the wall of said detection chamber, means for driving said elevator actuating shaft vertically within said chamber, and means associated with one of said sleeves positioned to engage said stop for effecting relative movement of said sleeves with respect to one another so as to compress said sealing means within said slot and urge the sealing means laterally outward into light-tight sealing engagement with the wall of said well.

3. The combination set forth in claim 2 further characterized in that said drive means comprise a manually operable actuating lever.

4. The combination set forth in claim 2 further characterized in that said drive means comprise a motorized drive operatively connected to said elevator actuating shaft.

5. An elevator mechanism for use with a light-tight radiation detector comprising, in combination, a housing, detector means mounted in said housing, a bore extending through said housing and between said detector means, a shutter mechanism for normally closing said bore, an elevator positioned within said bore, drive means for effecting vertical movement of said elevator, a shutter actuating shaft extending downwardly from said shutter mechanism, means operatively connecting said shutter actuating shaft with said elevator drive means, sealing means associated with said elevator, means for effecting expansion of said sealing means into intimate sealing engagement with the wall of said bore as an incident to vertical movement of said elevator, and means for twisting said shutter actuating shaft to open said shutter mechanism as an incident to vertical movement of said elevator.

6. An elevator mechanism for use with a light-tight radiation detector comprising, in combination, a housing, a light pipe mounted in said housing, detector means mounted in said housing adjacent said pipe, a bore extending through said housing and said pipe and defining an elevator shaft, a shutter mechanism for normally closing said shaft, an elevator positioned within said shaft, drive means for effecting vertical movement of said elevator, a shutter actuating shaft extending downwardly from said shutter mechanism, means operatively connecting said shutter actuating shaft with said elevator drive means, sealing means carried by said elevator, means for effecting expansion of said sealing means into intimate sealing engagement with the wall of said elevator shaft as an incident to vertical movement of said elevator, and means for twisting said shutter actuating shaft to open said shutter mechanism as an incident to vertical movement of said elevator.

7. Radiation detection apparatus comprising, in combination, a housing, a counting chamber formed in said housing, light transducer means mounted in said housing adjacent said chamber, a bore formed in said housing coaxial with said chamber and defining therewith an elevator shaft, an elevator mechanism mounted in said shaft for selectable axial movement therethrough and including an elevator platform coupled to an elevator actuating shaft, a first sleeve surrounding said actuating shaft, a second sleeve surrounding said first sleeve, a collar positioned on said first sleeve and extending laterally therefrom, sealing means surrounding said first sleeve and interposed between said collar and the adjacent extremity of said second sleeve, said sealing means normally spaced from the wall of said elevator shaft, means for driving said platform, actuating shaft, and sleeves axially through said elevator shaft as a unit, a stop formed on said housing, means carried by one of said sleeves for engaging said stop and terminating further axial movement of said one sleeve, and means for driving the other of said sleeves through a further axial incremental distance incident to termination of axial movement of said one sleeve for effecting relative closing movement of said collar and said second sleeve whereupon said sealing means is expanded into intimate light-tight engagement with the wall of said elevator shaft.

8. An elevator mechanism for use with radiation detection apparatus of the type having a housing, a counting chamber formed in the housing, and a bore formed in the housing coaxial with the chamber and defining therewith an elevator shaft, said elevator mechanism comprising, in combination, an elevator platform, an elevator actuating shaft coupled to said platform, a first sleeve surrounding said actuating shaft, a second sleeve surrounding said first sleeve, a collar positioned on said first sleeve and extending laterally therefrom, sealing means surrounding said first sleeve and interposed between said collar and the adjacent extremity of said second sleeve, said sealing means normally spaced from the wall of the elevator shaft, means for driving said platform, actuating shaft, and sleeves axially through the elevator shaft as a unit, a stop formed on the housing, means carried by one of said sleeves for engaging said stop and terminating further axial movement of said one sleeve, and means for driving the other of said sleeves through a farther axial incremental distance incident to termination of axial movement of said one sleeve for effecting relative closing movement of said collar and said second sleeve whereupon said sealing means is expanded into intimate light-tight engagement with the wall of the elevator shaft.

9. An elevator mechanism for use with radiation detection apparatus of the type having a housing, a counting chamber formed in the housing, and a bore formed in the housing coaxial with the chamber and defining therewith an elevator shaft; said elevator mechanism comprising, in combination, an elevator platform, an elevator actuating shaft coupled to said platform, a first sleeve surrounding said actuating shaft, a second sleeve surrounding said first sleeve, a collar positioned on said first sleeve and extending laterally therefrom, sealing means surrounding said first sleeve and interposed between said collar and the adjacent extremity of said second sleeve, said sealing means normally spaced from the wall of the elevator shaft, means for driving said platform, actuating shaft, and sleeves axially through the elevator shaft as a unit, a stop formed on the housing, means carried by said first sleeve for engaging said stop and terminating further axial movement of said first sleeve, and means for driving said second sleeve through a farther axial incremental distance incident to termination of axial movement of said first sleeve for effecting relative closing movement of said collar and said second sleeve whereupon said sealing means is expanded into intimate light-tight engagement with the wall of the elevator shaft.

10. An elevator mechanism for use with radiation detection apparatus of the type having a housing, a counting chamber formed in the housing, and a bore formed in the housing coaxial with the chamber and defining therewith an elevator shaft; said elevator mechanism comprising, in combination, an elevator platform, an elevator actuating shaft, a lost motion connection between said platform and said actuating shaft, a first sleeve surrounding said actuating shaft, a second sleeve surrounding said first sleeve, a collar positioned on said first sleeve and extending laterally therefrom, sealing means surrounding said first sleeve and interposed between said collar and the adjacent extremity of said second sleeve, said sealing means normally spaced from the wall of the elevator shaft, means for driving said platform, actuating shaft, and sleeves axially through the elevator shaft as a unit, a stop formed on the housing, means carried by one of said sleeves for engaging said stop and terminating further axial movement of said one sleeve, and means for driving the other of said sleeves through a farther axial incremental distance incident to termination of axial movement of said one sleeve for effecting relative closing movement of said collar and said second sleeve whereupon said sealing means is expanded into intimate light-tight engagement with the wall of the elevator shaft, said lost motion connection being operable following expansion of said sealing means to terminate axial movement of said platform for a predetermined increment of time as said actuating shaft is driven in a vertical direction.

11. For use with a radiation detector of the type employing a detection well monitored by at least one light transducer that is sensitive to spectral radiation, a shutter mechanism for effecting a light-tight seal at the entrance to the well and comprising, in combination, a shutter blade mounted on the detector for movement between a first position closing the end of the well and a second position opening the end of the well, an actuator shaft rigidly coupled to said blade, said shaft having a twisted portion intermediate its ends, reciprocable, non-rotatable drive means slidably engaged with said shaft, and means for effecting reciprocable movement of said drive means along a path parallel to the longitudinal axis of said shaft so that said non-rotatable drive means coacts with said twisted shaft portion as said drive means traverses said twisted shaft portion to rotate said shaft and to pivot said blade from one to the other of said positions.

12. For use with a radiation detector of the type employing a detection well monitored by at least one light transducer that is sensitive to spectral radiation, a shutter mechanism for effecting a light-tight seal at the entrance to the well and comprising, in combination, a shutter blade mounted on the detector for movement between a first position closing the end of the well and a second position opening the end of the well, a generally flat elongate actuator shaft rigidly coupled to said blade, said shaft having a twisted portion intermediate its ends, a reciprocable, non-rotatable tube slidably surrounding a portion of said shaft, cam means mounted in said tube for sliding engagement with said shaft, and means for effecting reciprocable movement of said tube along the longitudinal axis of said shaft so that when said cam means engage said twisted shaft portion the shaft is twisted to pivot said blade from one to the other of said positions.

13. For use with a radiation detector of the type employing a detection well monitored by at least one light transducer that is sensitive to spectral radiation, a shutter mechanism for effecting a light-tight seal at the entrance to the well and comprising, in combination, a fixed shutter blade having an aperture formed therein alined with said well, a movable shutter blade mounted on the detector for movement between a first position closing the aperture in said fixed blade and a second position opening the aperture, said blades defining a tortuous light path in said first position, an actuator shaft rigidly coupled to said movable blade, said shaft having a twisted portion intermediate its ends, reciprocable, non-rotatable drive means slidably engaged with said shaft, and means for effecting reciprocable movement of said drive means along a path parallel to the longitudinal axis of said shaft so that said non-rotatable drive means coacts with said twisted shaft portion as said drive means traverses said twisted shaft portion to rotate said shaft and to pivot said movable blade from one to the other of said positions.

14. A light-tight radiation detector for measuring the activity levels of samples in seriatim order and comprising, in combination, a stationary detection well, an elevator disposed within said well and including a platform and an elevator actuating shaft, sealing means carried by said elevator actuating shaft and normally spaced from the wall of said well, means for expanding said sealing means into light-tight engagement between said elevator and the wall of said well, said expanding means adapted to permit relative sliding movement between said elevator actuating shaft and said sealing means during period of expansion of the latter, a shutter mechanism for effecting a light-tight seal adjacent the upper end of said well, said shutter mechanism including a shutter blade mounted on the detector for movement between a first position closing the end of said well and a second position opening the end of said well, an actuator shaft rigidly coupled to said blade, said actuator shaft having a twisted portion intermediate its ends, and drive means rigidly coupled to said elevator actuating shaft for effecting vertical movement of said elevator, said drive means including a cam slidably engaged with said shutter actuator shaft, said cam positioned to engage the twisted portion of said actuator shaft subsequent to expansion of said sealing means into light-tight engagement with the wall of said well whereupon said shutter actuator shaft is twisted to pivot said blade from said first position to said second position.

15. A light-tight radiation detector for measuring the activity levels of samples in seriatim order and comprising, in combination, a stationary detection well, an elevator disposed within said well and including a platform and an elevator actuating shaft, a lost motion connection coupling said platform and said actuating shaft, sealing means carried by said elevator actuating shaft and normally spaced from the wall of said well, means for expanding said sealing means into light-tight engagement between said elevator and the wall of said well, said expanding means adapted to permit relative sliding movement between said elevator actuating shaft and said sealing means during periods of expansion of the latter, a shutter mechanism for effecting a light-tight seal adjacent the upper end of said well, said shutter mechanism including a shutter blade mounted on the detector for movement between a first position closing the end of said well and a second position opening the end of said well, an actuator shaft rigidly coupled to said blade, said actuator shaft having a twisted portion intermediate its ends, and drive means rigidly coupled to said elevator actuating shaft for effecting vertical movement of said elevator, said drive means including a cam slidably engaged with said shutter actuator shaft, said cam positioned to engage the twisted portion of said actuator shaft subsequent to expansion of said sealing means into light-tight engagement with the wall of said well whereupon said shutter actuator shaft is twisted to pivot said blade from said first position to said second position, said lost motion connection being operable to inhibit vertical movement of said platform during the period when said cam is traversing said twisted portion of said shutter actuator shaft.

16. A light-tight radiation detector for measuring the activity levels of samples in seriatim order and comprising in combination, a stationary detection well, an elevator disposed within said well and including a platform and an elevator actuating shaft, sealing means carried by said elevator actuating shaft and normally spaced from the wall of said well, means for expanding said sealing means into light-tight engagement between said elevator and the wall of said well, said expanding means adapted to permit relative sliding movement between said elevator actuating shaft and said sealing means during periods of expansion of the latter, a shutter mechanism for effecting a light-tight seal adjacent the upper end of said well, said shutter mechanism including a shutter blade mounted on the detector for movement between a first position closing the end of said well and a second position opening the end of said well, an actuator shaft rigidly coupled to said blade, said actuator shaft having a twisted portion intermediate its ends, drive means rigidly coupled to said elevator actuating shaft for effecting vertical movement of said elevator, said drive means including a cam slide slidably engaged with said shutter actuator shaft, said cam positioned to engage the twisted portion of said actuator shaft subsequent to expansion of said sealing means into light-tight engagement with the wall of said well whereupon said shutter actuator shaft is twisted to pivot said blade from said first position to said second position, and means for terminating operation of said drive means when said elevator platform is projected through said shutter mechanism and when said elevator platform is at the bottom of said well.

17. Radiation detection apparatus for measuring the activity levels of samples in seriatim order and comprising, in combination, a detection well, an elevator positioned in said well, said elevator including a platform and an elevator actuating shaft, a reciprocable non-rotatable tube coupled to said elevator actuating shaft and parallel with respect thereto, sealing means carried by said elevator and normally spaced from the wall of said well, means for expanding said sealing means into light-tight engagement between the wall of said well and said elevator, said sealing means being mounted for axial movement with said elevator actuating shaft during periods of non-expansion and free for relative slidable movement with respect thereto during periods of expansion, a shutter blade mounted on said apparatus for movement between a first position closing the end of said well and a second position opening the end of said well, a generally flat, elongated actuator shaft rigidly coupled to said blade, said shaft having a twisted portion intermediate its ends, the lower end of said actuator shaft telescopically and slidably received within said tube, cam means mounted in said tube for sliding engagement with said actuator shaft, and drive means for effecting reciprocable movement of said tube along the longitudinal axis of said actuator shaft so that said cam means engage said twisted shaft portion to pivot said blade from one to the other of said positions, said twisted shaft portion positioned on said actuator shaft so as to coact with said cam means for pivoting said blade from said first position to said second position at a point in time spaced from actuation of said expanding means whereupon a light-tight seal is effected by said sealing means prior to opening of said shutter blade and maintained by said sealing means until after closure of said shutter blade.

18. Radiation detection apparatus for measuring the activity levels of samples in seriatim order and comprising, in combination, a detection well, an elevator positioned in said well, said elevator including a platform and an elevator actuating shaft, a lost motion connection coupling said platform and said actuating shaft, a reciprocable non-rotatable tube coupled to said elevator actuating shaft and parallel with respect thereto, sealing means carried by said elevator and normally spaced from the wall of said well, means for expanding said sealing means into light-tight engagement between the wall of said well and said elevator, said sealing means being mounted for axial movement with said elevator actuating shaft during periods of non-expansion and free for relative slidable movement with respect thereto during periods of expansion, a shutter blade mounted on said apparatus for movement between a first position closing the end of said well and a second position opening the end of said well, a generally flat, elongated actuator shaft rigidly coupled to said blade, said shaft having a twisted portion intermediate its ends, the lower end of said actuator shaft telescopically and slidably received within said tube, cam means mounted in said tube for sliding engagement with said actuator shaft, and means for effecting reciprocable movement of said tube along the longitudinal axis of said actuator shaft so that said cam means engage said twisted shaft portion to pivot said blade from one to the other of said positions, said twisted shaft portion positioned on said actuator shaft so as to coact with said cam means for pivoting said blade from said first position to said second position at a point in time spaced from actuation of said expanding means whereupon a light-tight seal is effected by said sealing means prior to opening of said shutter blade and maintained by said sealing means until after closure of said shutter blade, said lost motion connection being operable to inhibit vertical movement of said platform during the period when said cam means is traversing said twisted portion of said shutter actuator shaft.

19. A light-tight radiation detector for measuring the activity levels of samples in seriatim order and comprising, in combination, a stationary detection well, an elevator disposed within said well and including a platform and an elevator actuating shaft, sealing means carried by said elevator actuating shaft and normally spaced from the wall of said well, means for expanding said sealing means into light-tight engagement between said elevator and the wall of said well, said expanding means adapted to permit relative sliding movement between said elevator actuating shaft and said sealing means during periods of expansion of the latter, a shutter mechanism for effecting a light-tight seal adjacent the upper end of said well, said shutter mechanism including a shutter blade mounted on the detector for movement between a first position closing the end of said well and a second position opening the end of said well, an actuator shaft rigidly coupled to said blade, said actuator shaft having a twisted portion intermediate its ends, drive means rigidly coupled to said elevator actuating shaft for effecting vertical movement of said elevator, said drive means including a cam slidably engaged with said shutter actuator shaft, said cam positioned to engage the twisted portion of said actuator shaft subsequent to expansion of said sealing means into light-tight engagement with the wall of said well whereupon said shutter actuator shaft is twisted to pivot said blade from said first position to said second position, and means for terminating operation of said drive means when said elevator platform is projected above said shutter blade and when said elevator platform is at the bottom of said well.

20. A light-tight sample transfer mechanism comprising, in combination, a housing, a light pipe mounted in said housing, detector means mounted in said housing adjacent said light pipe, a bore extending through said housing and said light pipe and defining an elevator shaft, shutter means for normally closing said shaft, an elevator positioned within said shaft, deformable sealing means interposed between said elevator and the elevator shaft defined by said light pipe and said housing, said sealing means being normally spaced from at least one of said elevator and the elevator shaft defined by said light pipe and said housing, drive means for effecting vertical movement of said elevator through said light pipe and said housing, and means for effecting deformation of said sealing means into intimate light-tight sealing engagement with both said elevator and the wall of said elevator shaft as an incident to vertical movement of said elevator.

21. A light-tight sample transfer mechanism comprising, in combination, a housing, a light pipe mounted in said housing, detector means mounted in said housing adjacent said light pipe, a bore extending through said housing and said light pipe and defining an elevator shaft, shutter means for normally closing said shaft, an elevator positioned within said shaft, sealing means carried by said elevator and normally spaced from said light pipe and said housing, reversible drive means for effecting vertical movement of said elevator through said light pipe and said housing, and means for effecting expansion of said sealing means into intimate sealing engagement with the wall of said elevator shaft at a point above said light pipe as an incident to vertical movement of said elevator in one direction, said means for effecting expansion of said sealing means in one direction of movement of said elevator being also effective to contract said sealing means from engagement with the wall of said elevator shaft as an incident to vertical movement of said elevator in the opposite direction.

References Cited by the Examiner
UNITED STATES PATENTS

| | | | |
|---|---|---|---|
| 2,866,904 | 12/58 | Hoellerich et al. | 250—105 X |
| 3,017,510 | 1/62 | Roucayrol et al. | 250—106 X |
| 3,102,194 | 8/63 | Van Den Brouek et al. | 250—105 X |

RALPH G. NILSON, *Primary Examiner.*

ARCHIE R. BORCHELT, JAMES W. LAWRENCE, *Examiners.*